A. R. LENDNER & F. BRIGGS.
APPARATUS FOR COOKING MEATS.
APPLICATION FILED JUNE 16, 1911.
1,073,915.
Patented Sept. 23, 1913.
2 SHEETS—SHEET 1.
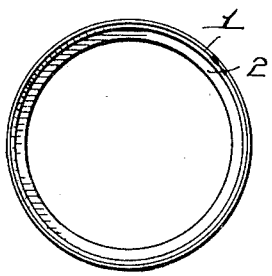
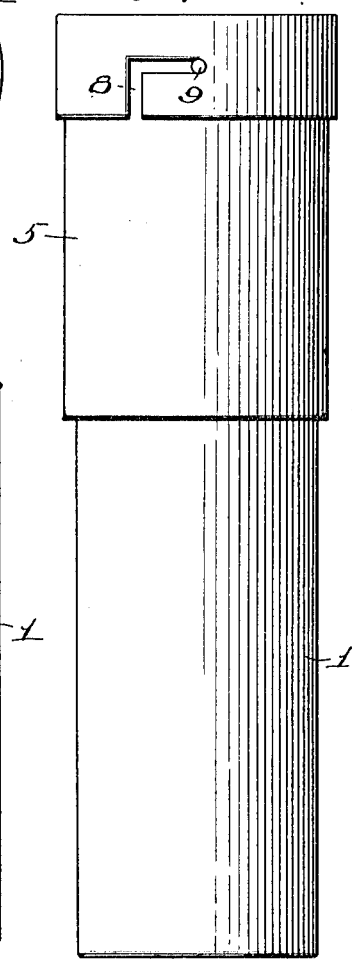
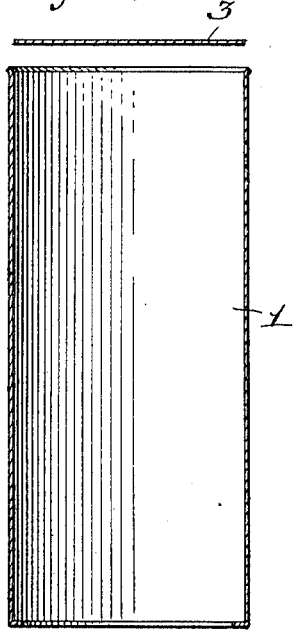
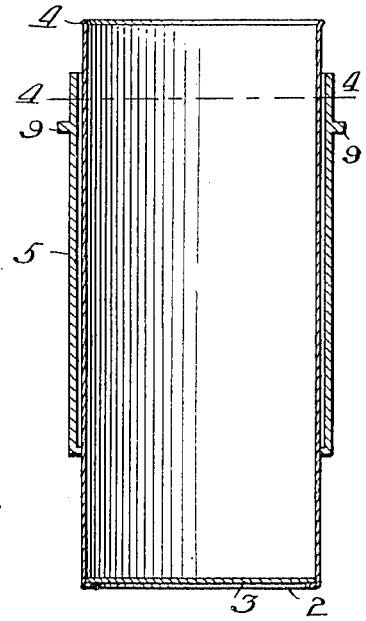
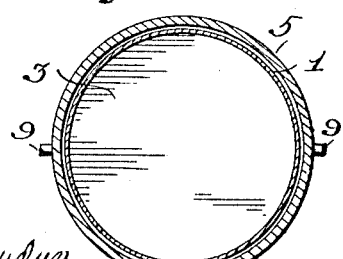

A. R. LENDNER & F. BRIGGS.
APPARATUS FOR COOKING MEATS.
APPLICATION FILED JUNE 16, 1911.
1,073,915.
Patented Sept. 23, 1913.
2 SHEETS—SHEET 2.
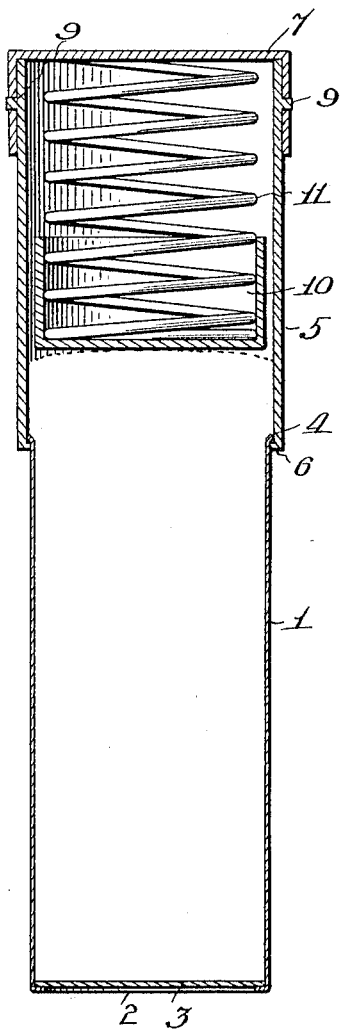
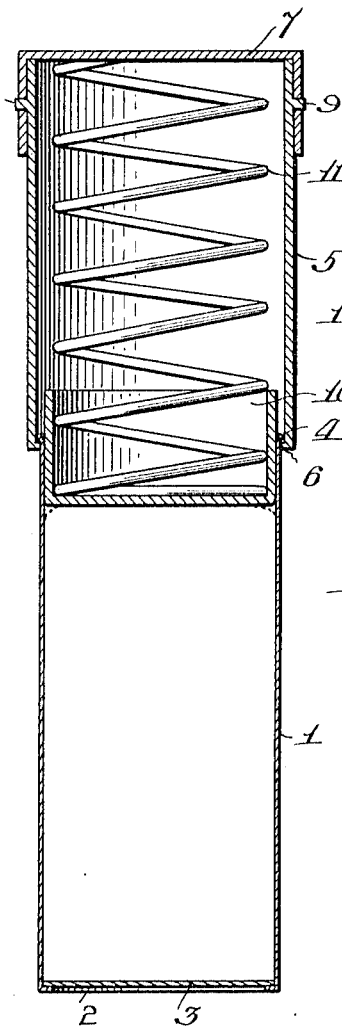
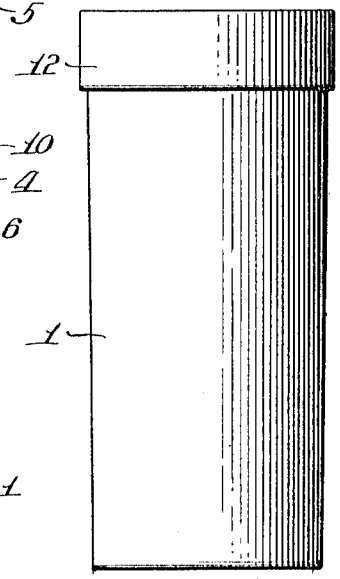
WITNESSES
D. R. Hershey.
R. C. Braddock.
Augustus R. Lendner
Frederick Briggs INVENTORS.
Horace S. Beall
Attorney

UNITED STATES PATENT OFFICE.

AUGUSTUS R. LENDNER, OF LOS ANGELES, CALIFORNIA, AND FREDERICK BRIGGS, OF WASHINGTON, DISTRICT OF COLUMBIA.

APPARATUS FOR COOKING MEATS.

1,073,915. Specification of Letters Patent. Patented Sept. 23, 1913.

Application filed June 16, 1911. Serial No. 633,537.

*To all whom it may concern:*

Be it known that we, AUGUSTUS R. LENDNER, of Los Angeles, in the county of Los Angeles, State of California, and FREDERICK BRIGGS, of Washington, District of Columbia, citizens of the United States, have invented an Apparatus for Cooking Meats, of which the following is a full and complete specification.

The primary object of our invention is to provide an apparatus for cooking meat in a sanitary manner, especially for shipment, and in which during the operation of cooking all the juices are retained and the fibers of the meat compressed into compact and solid form.

A further object of our invention is to provide an apparatus of this character in which while the meat is cooking it is compressed or packed into a can or receptacle for economy in shipping and for convenience in cutting the compressed meat into portions or slices.

Other objects and advantages of the invention will hereinafter appear, and what we claim as new and desire to secure by Letters-Patent is more specifically set forth in the appended claims.

In the accompanying drawings, forming a part hereof:—Figure 1 is a sectional view of the can or receptacle in which the meat is cooked and compressed. Fig. 2 is a plan view of said can or receptacle. Fig. 3 is a sectional view of the can or receptacle, with the removable cylinder thereon ready to receive the meat for cooking. Fig. 4 is a transverse sectional view, on the line 4—4 of Fig. 3. Fig. 5 is a vertical sectional view through the apparatus, showing the position of parts before the meat is cooked. Fig. 6 is a similar view, showing the position of the parts after the meat is cooked. Fig. 7 is a side view of Fig. 6. Fig. 8 is a side view of a modified form showing a tapered can or receptacle containing the compress meat and capped ready for shipment.

Like numerals of reference indicate like parts in all the figures of the drawings.

In carrying out our invention we employ in the first instance a can or receptacle 1, preferably made of thin sheet metal and provided at its lower end with an inwardly-projecting flange 2, upon which rests a removable bottom plate 3. This can or receptacle may be and preferably is slightly tapered from top to bottom, as shown in Fig. 8 (the taper being purposely exaggerated in the drawing) and at its upper end is provided with an outwardly flared rim or bead 4, for the purpose hereinafter explained. Upon this can or receptacle 1 is adapted to fit a cylinder 5, of heavier material than the can, and provided at its lower end with an inwardly-projecting flange or bead 6, adapted to engage with the flange or bead 4, so as to firmly and securely connect the can and cylinder together. It will be understood that the cylinder 5 is of the same diameter throughout its length, so that the can or receptacle 1 may be passed through the same to engage the flanges 4 and 6, and that these flanges may be comparatively small inasmuch as the can will bind within the cylinder owing to the taper of said can.

The outer or upper end of the cylinder is provided with a suitable cover fastened securely thereto, and in the present instance we provide a flanged cap 7, provided at opposite sides with bayonet slots 8, with which engage short pins 9 projecting from the cylinder.

In connection with the can and cylinder described we provide a cup-shaped follower 10, of such size with respect to the can that it will fit snugly within the upper end thereof, and between this cup-shaped follower and cap 7 of the cylinder is interposed a strong helical spring 11, adapted to exert a pressure upon the follower and move it in to the can.

In the operation of our invention the can 1, with its removable bottom-plate 3 in place, is passed through the cylinder 5, and the meat is placed within said can and lower part of the cylinder, to about the level indicated by Fig. 5. The follower 10 is then placed within the cylinder upon the mass of meat, and the spring 11 compressed between said follower and removable cap 7, which latter is fitted upon the upper end of the cylinder and locked thereon by engaging the pins with the bayonet slot. The device is then placed in the receptacle for cooking the meat, and during the cooking operation the force of the spring exerted upon the follower and against the mass of meat compresses the latter until it is massed within the can or receptacle, the juices which exude from the meat being confined within the can 1 and closed cylinder 5 so that it may be absorbed by the meat and retained. After the meat has been cooked to the desired extent, the cap 7, spring 11 and follower 10 are removed, and the cylinder 5 also removed. The can 1 containing the meat is then provided with a suitable cap or top 12, and is ready for shipment after the meat has cooled. It will be noted, therefore, that the meat is shipped in the original can in which it has been cooked, and therefore is not handled. This provides a sanitary method of cooking and shipping meat.

In using the meat so prepared and canned it is only necessary to remove the top or closure 12 and exert pressure against the removable or slidable bottom plate 3, which forces the compressed meat out of the other end of the can, so that portions or slices of the desired size may be cut off and the balance retained within the can. By reason of the taper of the can the solid mass of meat may be readily forced out of the larger or wider end of said can, and of course only so much of the meat forced out as it is desired to cut off at any one time, so that the balance which remains in the can can be protected by fitting on the cap again. It will be readily seen, therefore, that the apparatus not only provides a sanitary means for cooking and packing the meat for shipment, but also provides a sanitary means for handling the meat during use or sale by a merchant, and being retained in the can the latter serves to retain the moisture in the meat, preventing shrinkage.

It will be particularly noted, that by employing a spring to apply the pressure to the follower, the force is applied automatically during the cooking of the meat, or as the cooking progresses, the greater force being applied at the beginning of the cooking operation and gradually reduced as the meat is cooked, so that the fibers or grain of the meat are not broken to the extent they would be in the use of the ordinary screw-pressure.

Having described our invention, we claim:—

1. An apparatus for cooking meat, comprising a shipping can or receptacle, a cylinder detachably connected to the can or receptacle and extending above the upper end thereof, a follower located in the cylinder, and means coöperating with the cylinder for exerting pressure against the follower, substantially as shown and for the purpose set forth.

2. In an apparatus for cooking meat, the combination, of a shipping can or receptacle having a supporting shoulder at its lower end, and a bottom plate resting against said shoulder and slidable in the can; together with a cylinder detachably connected to the can and extending above the upper end thereof, the upper end of said cylinder being closed, a follower located in the cylinder, and a spring interposed between the follower and closed upper end of the cylinder, substantially as shown and for the purpose set forth.

3. In an apparatus for cooking meat, the combination, of a shipping can or receptacle, a cylinder slidable over the can or receptacle to project above the upper end thereof, means for detachably connecting the can and cylinder together, a top detachably connected to the upper end of the cylinder, a follower located in the cylinder, and means, as a spring, interposed between the follower and top of the cylinder, substantially as shown and for the purpose set forth.

4. An apparatus for cooking meat, comprising a shipping can or receptacle having an inwardly projecting flange at one end and an outwardly projecting flange at the other end, a bottom plate resting loosely upon the inwardly projecting flange, a cylinder fitting over the can and having an inwardly projecting flange at its outer end to engage the outwardly projecting flange on the can, said cylinder forming a continuation of the can and separable therefrom, a follower located in the cylinder, and means coöperating with the cylinder for exerting pressure against the follower.

5. An apparatus for cooking meat, comprising a can or receptacle tapered from one end to the other and having an inwardly-projecting flange at its smaller end, a bottom resting against the flange and slidable in the can, a cylinder fitting over the can and forming an extension at the wider end thereof, means for detachably connecting the cylinder to the can, a cap on the outer end of the cylinder and detachably connected thereto, a follower located in the cylinder, and a spring interposed between the follower and cap, substantially as shown and for the purpose set forth.

In testimony whereof we have signed our names to this specification in the presence of two subscribing witnesses.

AUGUSTUS R. LENDNER.
FREDERICK BRIGGS.

Witnesses:
CHAS. E. RIORDAN,
D. R. HERSHEY.